Figure 1:
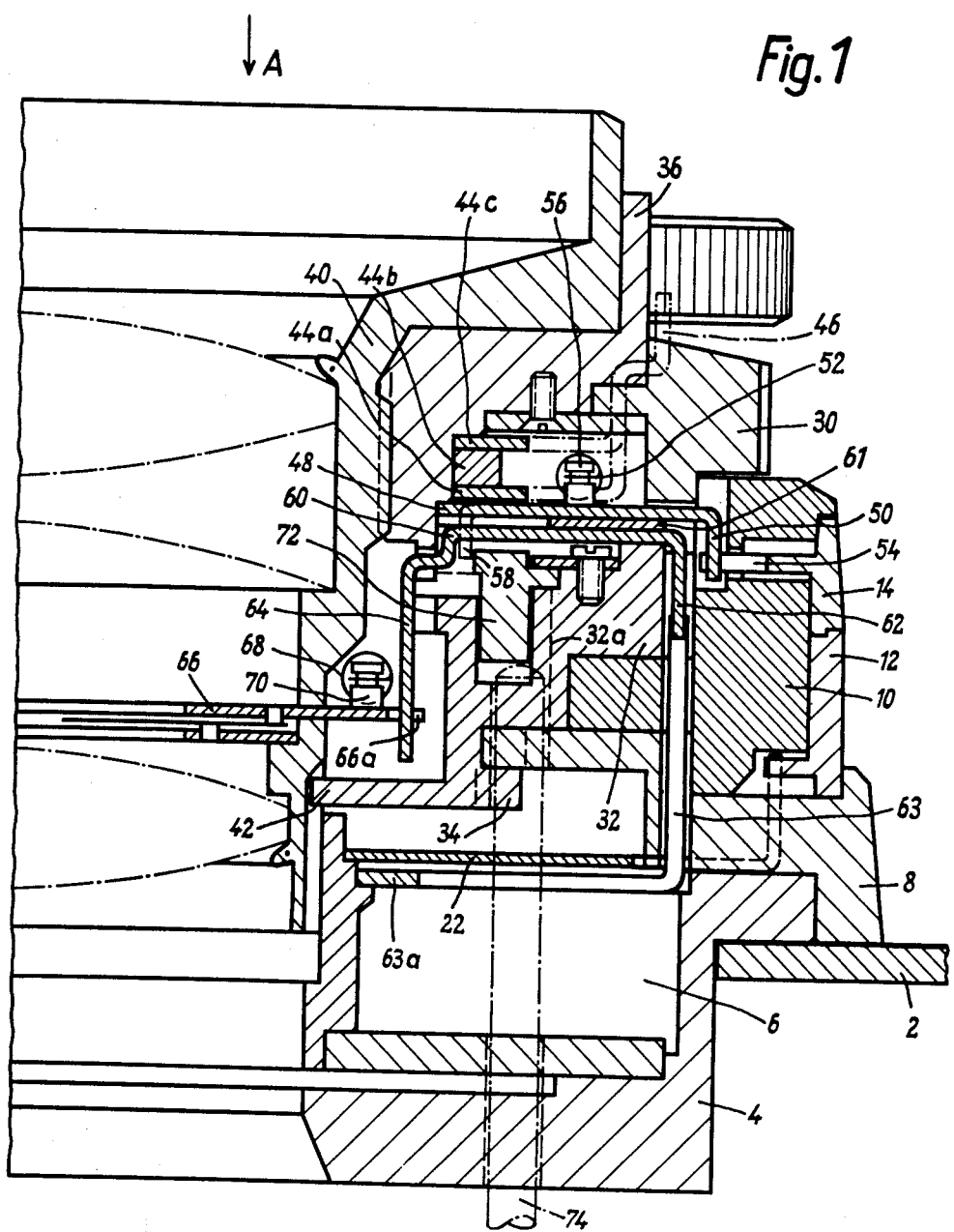

May 23, 1961  K. GEBELE  2,985,084
INTERCHANGEABLE OBJECTIVE FOR PHOTOGRAPHIC CAMERAS
Filed Dec. 30, 1958  2 Sheets-Sheet 1

May 23, 1961 K. GEBELE 2,985,084
INTERCHANGEABLE OBJECTIVE FOR PHOTOGRAPHIC CAMERAS
Filed Dec. 30, 1958 2 Sheets-Sheet 2

United States Patent Office 2,985,084
Patented May 23, 1961

2,985,084
INTERCHANGEABLE OBJECTIVE FOR PHOTOGRAPHIC CAMERAS
Kürt Gebele, Munich, Germany, assignor to Compur-Werk Friedrich Deckel O.H.G., Munich, Germany, a firm of Germany
Filed Dec. 30, 1958, Ser. No. 783,911
Claims priority, application Germany Jan. 10, 1958
2 Claims. (Cl. 95—44)

The invention relates to an interchangeable objective for photographic cameras, especially to the objective mount.

Interchangeable objectives are known in which the same optical system is offered for sale in different types of mount. This is done, on the one hand, to conform with different camera specifications and the different means of attachment provided in cameras made by different makers and, in the other, because the mount of an interchangeable objective required for a single-lens reflex camera must incorporate different equipment (such as a preselectable aperture stop, semi or fully automatic spring diaphragm) from that required in an interchangeable objective for cameras fitted with a coupled rangefinder.

The multiplicity of mounts that must be available to satisfy these diversified wants reduces the quantities that can be produced in a batch, imposes the necessity of keeping large stocks, and hence raises the retail price of such an interchangeable objective considerably.

The object envisaged by the invention is therefore the provision of a mount for an interchangeable objective which will permit the optional incorporation on the mount of either preselectable aperture equipment of a kind known per se for reflex cameras; or a rangefinder control cam of a kind known per se for cameras with coupled rangefinders; or both types of equipment for optional use on either type of camera.

Moreover, it is desired that the external dimensions of the fittings which correspond with those on the camera as well as the internal corresponding dimensions relating to the optical equipment should be retained without change.

According to the present invention an interchangeable objective for a photographic camera is characterised in that the mount contains a diaphragm which can be optionally used as a spring diaphragm or as a conventional diaphragm, as well as the cam for the control of a coupled rangefinder.

Preferably the envisaged object is achieved by dividing the objective mount perpendicularly to the optic axis, by incorporating rotatably in the front portion of the mount a diaphragm aperture preselector ring, a spring diaphragm actuating ring and possibly the members of a depth of field indicator, by providing in the rear portion of the mount a rotatable, axially fixed, ring which carries the rangefinder cam, and by locating a ring between the two parts of the mount which is held non-rotatably in position by screw pressure, and which axially locates both the diaphragm control ring as well as the spring diaphragm actuating ring, besides ensuring relative movement between the two rings without mutual interference.

Figure 2:
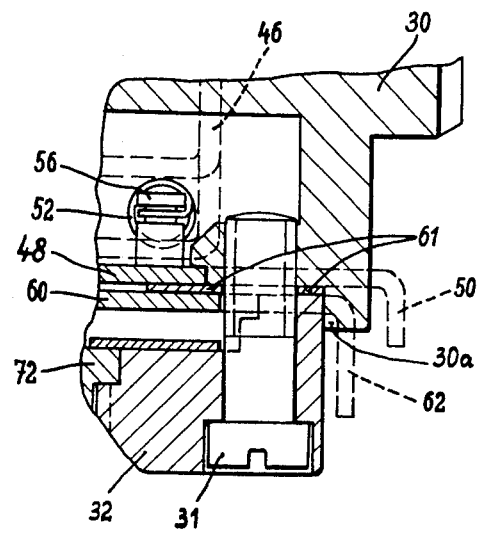
Figure 3:
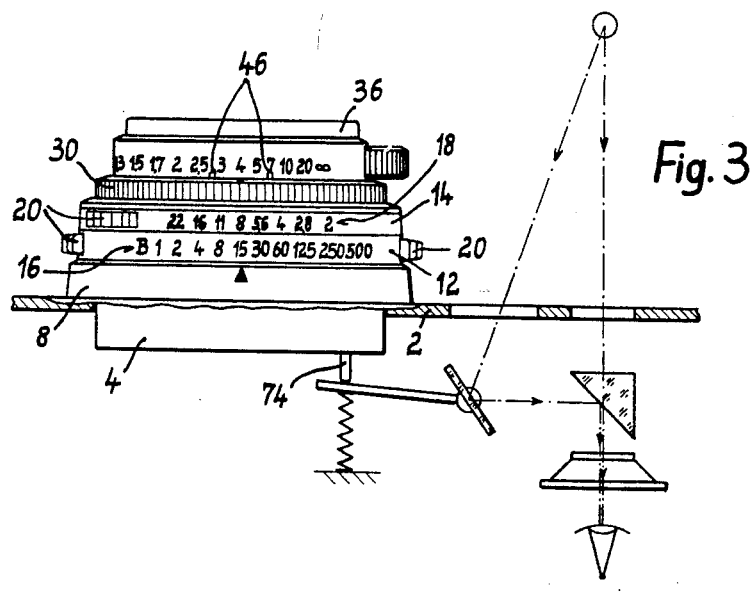

Other features of the invention will be disclosed in the following description of an illustrative form of construction of the invention shown in the drawings. In the drawings:

Fig. 1 is an axial section of an interchangeable objective,
Fig. 2 is a detail of Fig. 1 shown on a larger scale, and
Fig. 3 is a plan view of the interchangeable objective.

Secured to the face 2 of a camera is the flange of a shutter housing 4 containing a camera shutter 6 which is constructed in known manner and is not therefore shown. The shutter blades (not shown) are movable in one direction for opening the shutter and in opposite direction for closing said shutter. A bayonet ring 8, likewise rigidly secured to the face of the camera, surrounds the shutter housing and has bayonet lugs which are engaged by corresponding lugs 34 on the mount of the interchangeable objective.

Connected by screw means, not shown, with the bayonet ring on the face of the camera is an adapter ring 10 which together with the bayonet ring 8 provides radial and axial bearings for the rotatable shutter speed ring 12 and the rotatable diaphragm aperture setting ring 14.

The speed ring 12 and the diaphragm setting ring 14 carry an exposure time scale 16 and an aperture scale 18 respectively in conventional manner and they are provided with operating grips 20.

The speed ring 12 sets the shutter speed control ring 22 of the camera shutter and the diaphragm setting ring 14, which is fitted with detent means of known kind, e.g. a spring pressed ball on a stationary part and series of notches on said ring 14, actuates the diaphragm control ring 48 which is located inside the mount of the interchangeable objective.

The mount of the exchangeable objective comprises a front portion 30 and a rear portion 32 screwed together by means of few screws 31 and located in central alignment in relation to each other by a collar 30a. The rear portion 32 is fitted with bayonet lugs 34 for detachably fitting the mount to the bayonet ring 8 on the face of the camera.

The focusing ring 36, which is rotatably mounted on the front portion of the mount but axially locked, has an internal thread. The objective tube 40, which is prevented from rotating by means not shown, screws into this thread and can be axially moved by rotation of the focusing ring 36. The tube 40 is additionally guided by a centering face 42 on the rear portion of the mount.

The space between the front portion 30 of the mount and the focusing ring 36 contains rings 44a, 44b, 44c, of a depth-of-field indicating device, these rings being rotatable about the focusing ring and radially located thereby. Their pointers 46 which cooperate with the focusing scale, project through an arcuate slot in the mount. The depth-of-field indicating device is driven in conventional manner by the diaphragm control ring 48 through a coupling, e.g. as shown in the copending U.S. patent application of Franz Singer, Ser. No. 555,964, filed, December 28, 1955 (now Patent 2,926,588, granted March 1, 1960).

The diaphragm control ring 48 is mounted on the focusing ring 36 and radially located by it, as are the elements of the depth-of-field indicating device. It is fitted with a radial arm 50 having a bent over end which projects through a slot in the front portion 30. This arm is held by a helical spring 52 in contact with a projection 54 on the diaphragm setting ring 14. One end of the helical spring 52 is secured to a pin 56 on the diaphragm control ring 48 whereas the other end is attached to a pin, not shown, on the mount 30.

A lug 58 projecting perpendicularly from the diaphragm control ring 48 serves as a stop for the spring diaphragm actuating ring 60 which is likewise mounted rotatably about the focusing ring 36 and is radially located thereby.

A flat ring 61 is located between the two portions 30, 32 of the objective mount and engages in the space between the diaphragm control ring 48 and the spring diaphragm actuating ring 60. The parts 30, 32 and 61 are fixed together through the screws 31 so that the ring 61 cannot rotate and secures the axial position of the two rings 48, 60 besides permitting relative rotation thereof without mutual interference.

The spring operated diaphragm actuating ring 60 has an arm 62 extending radially outwards and guided together with arm 50 of the diaphragm control ring 48 by the objective mount, said arm 62 being bent over rearwards outside the mount so as to be actuable by the shutter assembly on the camera through an arm 63 of a ring 63a which is likewise rotatably mounted on the camera shutter 4. The ring 63a is coupled with the shutter setting and film transporting mechanism of the camera, e.g. in the manner shown and mentioned in connection with the ring 144 of the copending U.S. patent application of Kurt Gebele, Serial No. 612,465, filed September 27, 1956 (now Patent 2,967,472 granted January 10, 1961).

An extension 64 of the spring diaphragm actuating ring 60 engages a recess 66a in the movable diaphragm operating ring 66 which is urged by a helical spring 68 in a counter clockwise direction when viewed from the standpoint of the arrow A in Fig. 1, that is in the direction of closing the diaphragm opening. This helical spring is attached, on the one hand, to a pin 70 on the diaphragm operating ring 66 and, on the other hand, by a pin, not shown, on the objective mount.

The engagement or coupling between the parts 50 and 54 and the parts 62 and 63 is disengageable and is undone and remade by the action of twisting the interchangeable objective on to (in a counter clockwise direction when viewed from the standpoint of the arrow A) and off (in the opposite direction) the bayonet ring 8 of the camera.

For checking the accuracy of focus of the interchangeable objective when fitted to a camera with coupled rangefinder, conventional rangefinder coupling means are provided. These consist of a ring 72 rotatably mounted and axially secured in the rear portion of the mount, this ring carrying an axially rising cam for cooperation with an axially movable feeler pin 74 which is mounted in the body of the camera and projects from the front wall thereof. The ring 72 is connected (e.g. through a recess and arm connection of known art, which may be similar, e.g., to the previously mentioned recess 66a and arm 64), with the focussing ring 36 for common rotation. To permit the feeler pin 74 to project into the objective mount 32, the rear wall of the latter has an arcuately cut slot 32a of a length which conforms with the angle of twist imparted to the mount when being fitted into the bayonet ring. The movements of the feeler pin are transmitted to the deflectable member of a rangefinder by conventional means which are therefore only schematically indicated. Arrangement of this art is disclosed in the copending U.S. patent application of Walter Voss, Serial No. 419,286, filed on March 29, 1954 and now abandoned.

Fig. 1 of the drawing shows the arrangement with the interchangeable objective in use on a single-lens reflex camera. Of course, the pin 74, shown in Fig. 1 in dotted lines, is in this case omitted. The diaphragm aperture is preselectable in the usual manner by means of the diaphragm setting ring 14 and the diaphragm scale 18, whereby the rings 48, 60 and 66 move in the same direction as the ring 14. When the shutter is being set and the film transported, the ring 63a is moved from the inoperative position to a clockwise direction when viewed from the standpoint of the arrow A and, in the diaphragm preselected position, its arm 63 comes in engagement with the arm 62 of the ring 60. The rings 60 and 66 are now also adjusted in the same direction for the purpose of full opening the diaphragm blades for focusing purposes. In this focusing position the coupling of the parts 58 and 60 is disconnected, while the rings 14 and 48 stand in the preselected position. After completing the focusing operation and by releasing the camera shutter, the rings 60 and 66 spring again in the position preselected by rings 14 and 48. The parts 58 and 60 are now again coupled.

When in other cases this interchangeable objective is not fitted to a single-lens reflex camera, but to a camera with a coupled rangefinder (Fig. 3), the diaphragm aperture is preselected in the same manner with the help of the diaphragm setting ring 14. The spring operated diaphragm actuating ring 60 is in this case not controlled by the arm 63 from the body of a camera since on this camera type the part 63a, 63 is omitted, but merely serves as a transmission element for operating the ring 66 and setting the diaphragm blades. But on the contrary, the feeler pin 74 is now in use and the ring 72 operates the range finder in the mentioned manner when focusing the camera on ring 36.

The parts 72 and 74 for the control of the rangefinder are not required when the interchangeable objective is used on a single-lens reflex camera and in such a case the ring 72 need not be mounted in the interchangeable objective. In certain cases, the ring 60 may be entirely omitted if the diaphragm control ring 48 is provided with the extension 64.

From the foregoing it will be readily understood that an interchangeable objective mount according to the invention provides facilities for universal adaption, since a simple modification or omission of parts of the internal equipment permits such a mount to be adapted for use in conjunction with single-lens reflex cameras or with cameras with a coupled rangefinder. Moreover, the described interchangeable mount can be adapted for optional use with either camera if it is equipped with all the elements or rings 48, 60, 66 and 72 that have been described, in which cases these parts shall be used or not used according to the required type of camera.

The invention therefore permits the production of interchangeable objective mounts to be rationalized and affords the convenience of considerably reducing the necessary number of fittings that must be kept in stock.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What I claim is:

1. An interchangeable objective for photographic cameras, characterized in that the mount contains a diaphragm mechanism which can be optionally used as a spring diaphragm or as a conventional diaphragm mechanism, as well as a cam means coupled with the focusing member for the control of a coupled rangefinder, and wherein the mount is divided at least in two mount parts, the front portion of the divided mount containing a diaphragm aperture control ring and a spring operated diaphragm actuating ring, whereas the rear portion of the mount has a ring rotatably, but axially immovably mounted therein, which carries the control cam for the rangefinder, an additional ring is non-rotatably held between the two parts of the mount to secure the axial location of the diaphragm aperture control ring as well as of the spring operated diaphragm actuating ring whilst permitting their relative rotation without mutual interference.

2. An interchangeable objective according to claim 1 wherein the members of a depth-of-field indicating device are contained in the front portion of the divided mount.

References Cited in the file of this patent

UNITED STATES PATENTS

| | | |
|---|---|---|
| 2,364,413 | Wittel | Dec. 5, 1944 |
| 2,852,278 | Dere | Sept. 16, 1958 |

FOREIGN PATENTS

| | | |
|---|---|---|
| 676,075 | Great Britain | July 23, 1952 |
| 778,209 | Great Britain | July 3, 1957 |